United States Patent
Medlock

(10) Patent No.: US 7,689,608 B2
(45) Date of Patent: Mar. 30, 2010

(54) METHODS, SYSTEMS AND COMPUTER PROGRAM PRODUCTS FOR CONTROLLING NETWORK ASSET RECOVERY

(75) Inventor: Joe Medlock, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 405 days.

(21) Appl. No.: 11/708,225

(22) Filed: Feb. 20, 2007

(65) Prior Publication Data

US 2008/0201471 A1 Aug. 21, 2008

(51) Int. Cl.
*G06F 7/00* (2006.01)
*G06F 17/00* (2006.01)

(52) U.S. Cl. .................. 707/674; 707/675; 707/676; 707/677

(58) Field of Classification Search .............. 707/202
See application file for complete search history.

(56) References Cited

U.S. PATENT DOCUMENTS

| | | | |
|---|---|---|---|
| 6,272,208 B1 | 8/2001 | Kasrai | 379/15.03 |
| 6,295,540 B1 | 9/2001 | Sanschagrin et al. | 707/201 |
| 6,539,396 B1 * | 3/2003 | Bowman-Amuah | 707/103 R |
| 6,732,181 B2 * | 5/2004 | Lim et al. | 709/229 |
| 7,421,493 B1 | 9/2008 | Adams | 709/224 |
| 7,467,267 B1 * | 12/2008 | Mayock | 711/162 |
| 2002/0194319 A1 * | 12/2002 | Ritche | 709/223 |
| 2003/0014332 A1 | 1/2003 | Gramling | 705/28 |
| 2004/0030705 A1 * | 2/2004 | Bowman-Amuah | 707/100 |
| 2004/0143653 A1 * | 7/2004 | Taylor et al. | 709/223 |
| 2004/0210662 A1 * | 10/2004 | Lim et al. | 709/229 |
| 2004/0220975 A1 * | 11/2004 | Carpentier et al. | 707/200 |
| 2005/0015292 A1 * | 1/2005 | Wilson et al. | 705/9 |
| 2005/0015501 A1 * | 1/2005 | Kaplan et al. | 709/228 |
| 2005/0080663 A1 * | 4/2005 | Bauckmann | 705/11 |
| 2006/0059253 A1 * | 3/2006 | Goodman et al. | 709/223 |
| 2006/0059262 A1 * | 3/2006 | Adkinson et al. | 709/225 |
| 2006/0182230 A1 * | 8/2006 | Boetje et al. | 379/9.03 |
| 2008/0183728 A1 * | 7/2008 | Cornelius et al. | 707/100 |

(Continued)

OTHER PUBLICATIONS

Telcordia—Training—WFA Essentials—OnLine Live, WFA Essentials—OnLive Live, http://www.telecordia.com/training/course_desc.jsp?id=9775, 2 pages, prior to 2007.

(Continued)

*Primary Examiner*—Hung T Vy
*Assistant Examiner*—Tuan Pham
(74) *Attorney, Agent, or Firm*—Myers Bigel Sibley & Sajovec

(57) ABSTRACT

Computer-implemented methods for controlling network asset recovery for a communication network include receiving an identification of a plurality of non-utilized assets from an asset identification system. Business rules to be applied to the non-utilized assets are identified. One of the non-utilized assets is automatically identified for recovery based on the identified business rules. A job ticket identifying the one of the non-utilized assets is automatically generated that includes information from the received identification of the plurality of non-utilized assets sufficient to direct an assigned technician to a physical location of the one of the non-utilized assets. A recovery dispatch system associated with the one of the non-utilized assets is determined and the generated job ticket is submitted to the determined recovery dispatch system.

13 Claims, 10 Drawing Sheets

U.S. PATENT DOCUMENTS

2009/0049057 A1* 2/2009 Ghani ................... 707/10

OTHER PUBLICATIONS

Qwest, Wholesale: Operation Support Systems, Mediated Access Electronic Bonding Trouble Administration (MEDIACC—EBTA), http://www.qwest.com/wholesale/systems/mediacc-ebta.html, 2 pages, Apr. 15, 2005.

Qwest Wholesale, Local Business Procedures, Maintenance and Repair Overview—V70.0, http://www.qwest.com/wholesale/clecs/maintenance.html, 21 pages, Jan. 8, 2007.

* cited by examiner

US 7,689,608 B2

METHODS, SYSTEMS AND COMPUTER PROGRAM PRODUCTS FOR CONTROLLING NETWORK ASSET RECOVERY

BACKGROUND OF THE INVENTION

The present invention relates to telecommunication networks, and, more particularly, to inventory management for telecommunication networks.

Inventory management for telecommunications networks generally tracks components, such as circuit cards, provided at different field locations to support different user services. Over time, the inventory database systems related to such assets may become inaccurate representations of the infrastructure as circuit cards and the like are changed over time to respond to different user requirements, discontinued services and the like. Such a data mismatch with the actual network configuration may lead to problems in customer service, outages, lost revenues from unbilled circuits, loss of use of capital assets and stress on employees from relying on data that does not match actual network field conditions. Effort by field technicians may be required to call attention to the mismatches as discovered in the field.

Many of today's intelligent network elements (INEs) have the ability to report their configuration to an external management system either on request or autonomously as changes occur.

TIRKS™ (Trunk Integrated Record Keeping System) is a Telcordia integrated, computerized network inventory and assignment system that supports the provisioning process for special service circuits, message trunks, and carrier circuits, and also provides inventory management of facilities and equipment. The TIRKS system supports the full range of transmission technologies, such as SONET, including self-healing rings and other sophisticated SONET configurations, European digital hierarchy standards (SDH), digital circuitry hierarchy (DS0, DS1, DS3), and analog voice circuits.

The TIRKS system allows users to automatically log, route, and monitor the progress of work orders (WO), perform end-to-end circuit design based on generic specifications and automated scripts, execute interactive, user-defined queries and generate customized reports of work center activity, critical dates, and jeopardy conditions, and interface seamlessly with other Telcordia operations support systems. However, discrepancies may occur from data entry errors, equipment not installed as planned, discrepancies between the actual plug-ins shipped from those expected, substitutions or errors by field personnel, or an element management system (EMS) being unable to make an assignment.

NORTEL'S integrated network management/manager (INM) broadband product is an open, multi-technology and multi-vendor distributed element management system. Nortel's Integrated Network Management (INM) Broadband EMS employs the philosophy of "the network is the database", and can make use of current technology to obtain an accurate, up-to-date view of the configurations of all the network elements that the INM controls. INM may consolidate and adapt information from the network under management control to open, standards-based interfaces. Communications with the managed network elements may be provided using TL1 (transaction language-1), SNMP (simple network management protocol), CMIP (common information management protocol) or proprietary protocols.

Synchronous Optical Network Capacity Activation Program (SONETCAP) is a BellSouth network communication product that may be connected to a telecommunications network. SONETCAP may be connected to and upload data from intelligent network equipment using TL1 commands to extract information related to circuit card configuration for a particular device, cross connections, any port in service and the like.

The TIRKS system databases do not always accurately reflect how the equipment is actually configured in the network. Inaccurate data can cause fallout in the provisioning process, stranding of equipment, and unnecessary dispatches resulting in increased costs, missed due dates, and customer dissatisfaction. Field conditions that may create database discrepancies include: assignment made by the provisioning system is actually in use and therefore not available, incorrect assignment based on incorrect view of the actual field conditions, missing equipment plug-ins in the field; and the EMS being unable to make assignment.

Current TIRKS users generally must contend with ongoing TIRKS database discrepancies between the facilities assignments associated with service or repair orders and the actual field conditions encountered. One known solution to update TIRKS databases is a manual solution. Subsequent to completing the service or repair order, work center personnel use the actual field information discovered using the INM broadband user interface (UI) to manually update the TIRKS database. This technique has been fairly successful, although disadvantages include the sheer amount of data (hence human effort) involved and its reactive versus proactive nature. This activity can sometimes lead to multiple database corrections because of numerous inaccuracies. In addition, for the most part, this update effort is triggered by service or repair activity and is not part of a programmed work effort.

Another proposed approach to alignment of TIRKS uses INM. A synchronizer receives data from the Network Manager and the TIRKS inventory data to determine data discrepancies. A discrepancy may be corrected automatically or manually.

SUMMARY OF THE INVENTION

In some embodiments of the present invention, computer-implemented methods for controlling network asset recovery for a communication network include receiving an identification of a plurality of non-utilized assets from an asset identification system. Business rules to be applied to the non-utilized assets are identified. One of the non-utilized assets is automatically identified for recovery based on the identified business rules. A job ticket identifying the one of the non-utilized assets is automatically generated that includes information from the received identification of the plurality of non-utilized assets sufficient to direct an assigned technician to a physical location of the one of the non-utilized assets. A recovery dispatch system associated with the one of the non-utilized assets is determined and the generated job ticket is submitted to the determined recovery dispatch system.

In other embodiments, automatically generating a job ticket includes recording the job ticket in a recovery database and submitting the generated job ticket is followed by receiving a job completion status report from the determined recovery dispatch system and updating the recovery database based on the received the job completion status report. Submitting the generated job ticket may be followed by receiving the job completion status report from the assigned technician at the determined recovery dispatch system and submitting the job completion status report for use in updating the recovery database.

In further embodiments, determining the recovery dispatch system associated with the one of the non-utilized assets includes determining if the physical location of the one of the non-utilized assets is a central office location, an outside plant location or a customer location and identifying one of a plurality of recovery dispatch systems as the determined recovery dispatch system based on whether the determined physical location of the one of the non-utilized assets is a central office location, an outside plant location or a customer location. Identifying business rules to be applied to the non-utilized assets may include identifying a plurality of tables associated with the business rules and updating the identified tables. Updating the identified tables may include determining if any of the identified tables have been changed since a last update of the identified tables and updating any of the identified tables determined to have been changed since the last update of the identified tables.

In other embodiments, the received identification of a plurality of non-utilized assets is generated by the asset identification system based on an automated comparison of an inventory management database for a telecommunications network and an automated querying of assets on the telecommunications network to determine a current inventory. The received identification of the plurality of non-utilized assets may be a spreadsheet including a plurality of records, respectively associated with ones of the non-utilized assets. Automatically identifying the one of the non-utilized assets for recovery may include selecting a next one of the records, selecting one of the identified business rules and determining fields of the next one of the records used by the selected one of the identified business rules and evaluating the next one of the business records based on the selected one of the identified business rules and the determined fields. Selecting one of the identified business rules and evaluating based on the selected one of the identified business rules and the determined fields may be repeated for others of the plurality of identified business rules. Selecting a next one of the records, selecting one of the identified business rules, evaluating and repeating selecting one of the identified business rules may be repeated for each of the records.

In yet other embodiments, selecting one of the identified business rules is preceded by identifying duplicate ones of the records and identifying ones of the fields of the records that are missing data. Identified duplicate ones of the records and/or records including identified ones of the fields missing data are reported. Identified duplicate ones of the records and/or records including identified ones of the fields missing data are skipped when selecting a next one of the records.

In further embodiments, determining a recovery dispatch system associated with the one of the non-utilized assets is carried out by a Work and Force Administration/Control (WFA/C) system and the determined recovery dispatch system is a Work and Force Administration/Dispatch In (WFA/DI) system or an integrated dispatch system (IDS/Force) system. The WFA/C system may be one of a plurality of WFA/C systems associated with different remote physical locations and determining a recovery dispatch system may include passing a record associated with the identified one of the non-utilized assets to a remote application server, identifying one of the plurality of WFA/C systems associated with the physical location of the identified one of the non-utilized assets at the remote application server and passing a WFA/C trouble report for the identified one of the non-utilized assets from the application server to the identified one of the WFA/C systems. Passing a WFA/C trouble report may be followed by passing the WFA/C trouble report from the identified one of the WFA/C systems to the WFA/DI system. Automatically generating a job ticket may include recording the job ticket in a recovery database and passing the WFA/C trouble report from the identified one of the WFA/C systems to the WFA/DI system may be followed by receiving a job completion status report from the identified one of the WFA/C systems and updating the recovery database based on the received job completion status report.

In other embodiments, the generated job ticket includes data associated with the one of the non-utilized assets from the received identification of the plurality of non-utilized assets and further includes supplemental information not contained in the received identification of the plurality of non-utilized assets. The assets may be intelligent network elements and the communication network may be a telecommunications network.

In further embodiments, communication network asset recovery systems include a non-utilized asset identification system that generates an identification of a plurality of non-utilized assets. A work force administration system is configured to control assignment of asset recovery jobs to recovery technicians. The systems further include a plurality of business rules. A non-utilized asset recovery management system is configured to identify ones of the business rules to be applied to the non-utilized assets, automatically identify one of the non-utilized assets for recovery based on the identified business rules, automatically generate a job ticket identifying the one of the non-utilized assets and including information, from an identification of the plurality of non-utilized assets received from the non-utilized asset identification system, sufficient to direct an assigned recovery technician to a physical location of the one of the non-utilized assets and to submit the generated job ticket to a recovery dispatch system. The work force administration system and/or the non-utilized asset recovery management system identify the recovery dispatch system associated with the one of the non-utilized assets.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EXEMPLARY EMBODIMENTS

Figure 1:
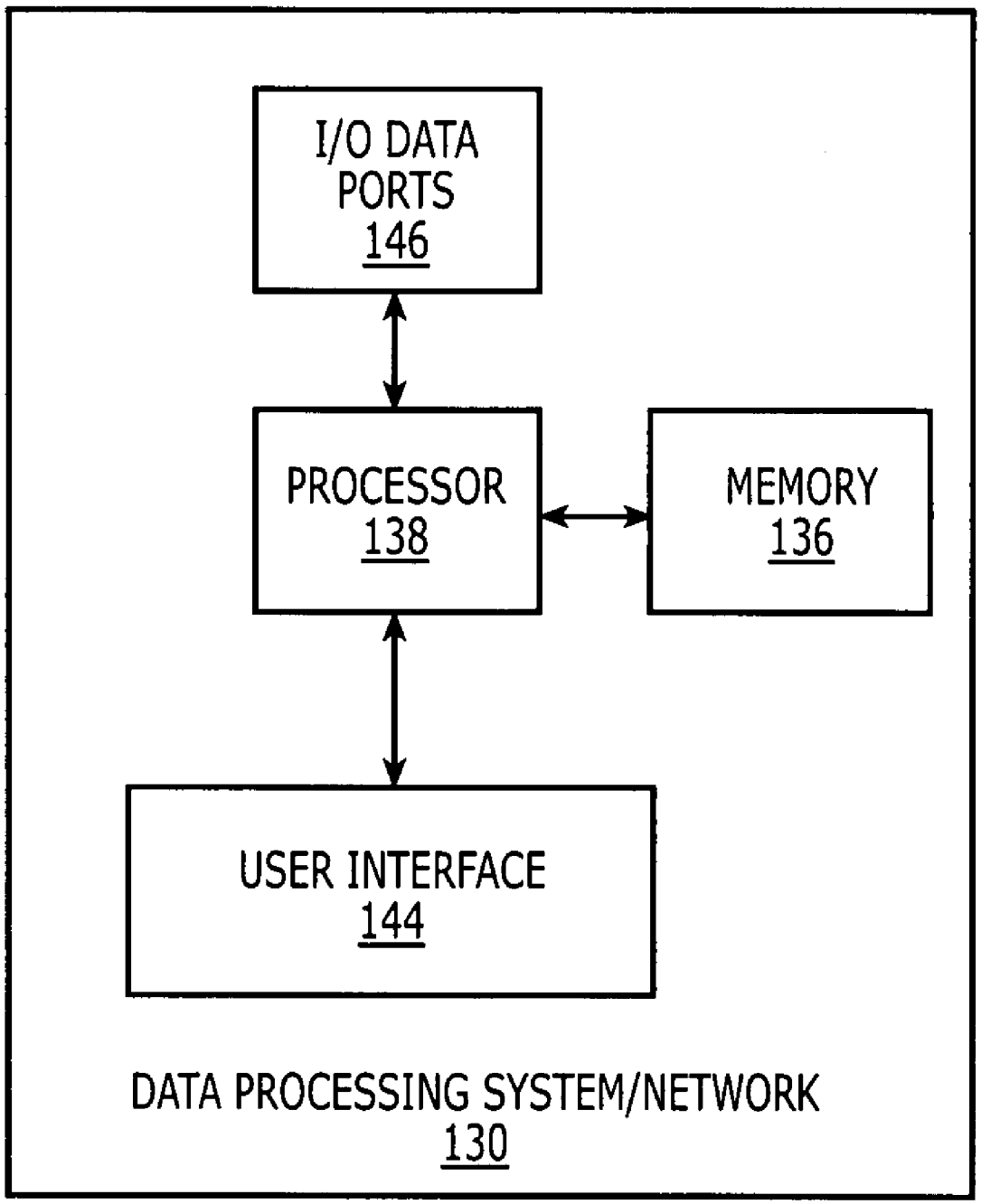
FIG. 1 is a block diagram illustrating a data processing system suitable for use in some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

The present invention will be described below by reference to particular embodiments applied to an exemplary workflow environment. By way of background, the workflow environment to which embodiments of the present invention may be applied will now be described. The following process flow may be carried out after a plurality of target devices/cards for recovery has already been identified based on a comparison of inventory data and intelligent asset query data and a Candidate Report listing the identified targets is received for further processing. Identification of such a plurality of candidate target devices/cards for recovery report is described in commonly owned United States Patent Application Publication No. 2006/0059262, which is incorporated herein in its entirety by reference.

The below process flow may be initiated, for example, by the receipt of an email candidate report in the form of an Excel Spreadsheet. This report is then scrubbed by a Support Team, and run through a series of hashes to determine if there are duplicate records. The report is then forwarded to a further group, referred to herein as the "STC." The STC applies manual updates to the report, using a series of spreadsheets, and then automated updates through a series of scripts. The candidate report is divided into: 1) central office candidates that are entered into the work and force administration/dispatch in (WFA/DI) dispatch system, 2) outside field force candidates that are entered into the performance measurements analysis (PMA) system and 3) customer provided equipment candidates that are placed on a web site for the field managers to pick up when they can work them. After the candidate is placed on the dispatch system, it is added to a database for tracking, which database is referred to herein as the CAPTURE Website Access Database, by the STC. This process flow may take, for example, approximately three to four days from the time the candidate report is received until the card appears on the CAPTURE Website.

Once the candidate card has been placed on WFA/DI or PMA for recovery the following actions take place in the exemplary process workflow. For WFA/DI:
A. A WFA/DI ticket is created for each central office (CO) card.
B. The WFA/DI ticket must be transferred from the SONET Center to a WFA/DI Network Operations Center, where a technician can be assigned and loaded.
C. A central office (CO) technician is assigned to recover the card(s).
D. The CO technician connects to the CAPTURE Web site, finds the card they have been dispatched on, and obtains additional information about the card.
E. The CO Technician recovers the card, or reports it as not recoverable.
F. If the card is recovered, the CO technician obtains a primary interexchange carrier (PICS) shipping order number, and ships the card back to the PICS warehouse.
G. The CO technician closes the WFA/DI ticket.
H. The CO technician connects to the CAPTURE Web site and changes the card status to recover, or another status as appropriate.
I. An OQS report is run each day in WFA/DI to identify all tickets closed the previous day. This report is sent by email to the STC.
J. A STC Technician manually checks each closed report. If there are discrepancies in the closeout information the WFA/DI technician is contacted, or another WFA/DI ticket is dropped to dispatch the card again.

For PMA:
A. A PMA ticket is created for each card that exist in an RT site.
B. The PMA tickets are loaded with a due date 90 days in the future, which presents a problem. If the tickets are not picked up within the 90 days, PMA automatically dumps all tickets into the loop maintenance operating system (LMOS).
C. When the field forces can work CAPTURE recoveries the supervisors or WMC accesses PMA to find tickets that are assigned in their area of responsibility.
D. The tickets are moved from PMA to LMOS, where they are passed to outside field forces system (IDS) to be assigned to a technician.
E. The field technician comes into the CAPTURE web site and obtains all information about the card to be recovered.
F. The field technician recovers the card(s), or reports them as not recoverable.
G. If the card is recovered, the field technician obtains a PICS shipping order number, and ships the card back to the PICS warehouse.
H. The field technician closes the IDS ticket, which closes the LMOS ticket and the PMA ticket.
I. The field technician connects to the CAPTURE Web site and changes the card status to recovered, or another status as appropriate.
J. A report is run each day in the STC for CAPTURE tickets closed yesterday in PMA.

A STC technician checks each closed PMA ticket to make sure the web ticket was closed properly. If there are discrepancies the STC technician contacts the field technician, or updates the web record with the correct information.

In some embodiments of the present invention, the above flow is modified, which may provide for improved card recovery and processing of information related to the same.

Various embodiments will now be described with reference to the flowcharts and block diagrams of FIGS. 1-9. Note that the block diagram and the flowcharts of FIGS. 6-9 particularly correspond to an application of the present invention to the exemplary process flow described above.

FIG. 1 illustrates an exemplary embodiment of a computing device or data processing system 130 configured in accordance with some embodiments of the present invention. The data processing system 130, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet protocol (IP) connection, and may thereby provide a means for communicating with a variety of different databases and network assets of a communications network. These components may be conventional components such as those used in many conventional data processing systems, which may be configured to operate as described herein.

Figure 2:
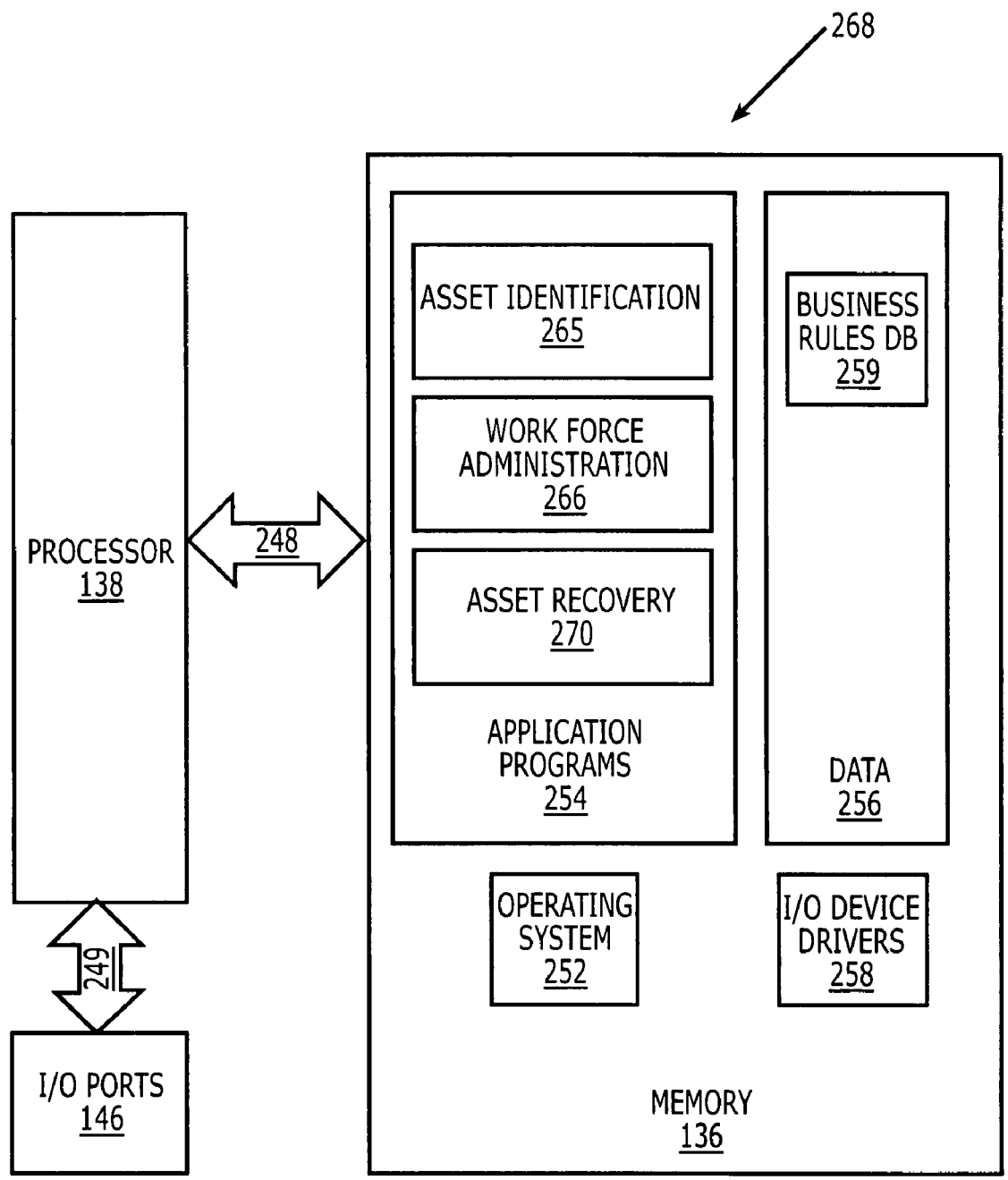
FIG. 2 is a block diagram illustrating a communication network asset recovery system according to some embodiments of the present invention.

Referring now to FIG. 2, a block diagram of a communication network asset recovery system 268 for network asset management is provided that illustrates systems, methods, and computer program products in accordance with various embodiments of the present invention as will now be discussed. The processor 138 communicates with the memory 136 via an address/data bus 248. The processor 138 can be any commercially available or custom microprocessor, microcontroller, digital signal processor, enterprise, application, personal, pervasive and/or embedded processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As shown in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the reconciliation/recovery system 268 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As further illustrated in FIG. 2, according to some embodiments of the present invention the application programs 254 may be configured to provide a communications network asset recovery system including an asset identification module 265 configured to generate an identification of a plurality of non-utilized assets. A work force administration module 266 is configured to control assignment of asset recovery jobs to recovery technicians. An asset recovery module 270 is configured to identify ones of a plurality of business rules to be applied to the non-utilized assets, to automatically identify one or more of the non-utilized assets for recovery based on the identified business rules, to automatically generate a job ticket(s) identifying one or more of the non-utilized assets, which tickets include information from and identification of the non-utilized assets received from the asset identification module 265, which information is sufficient to direct and assign a recovery technician to a physical location of the non-utilized asset(s) and, finally, to submit the generated job ticket to a recovery dispatch system. The work force administration module 266, or other work force administration system, and/or the asset recovery module 270, or other non-utilized asset recovery management system, identify the recovery dispatch system associated with non-utilized assets identified for recovery.

Assets may be, for example, intelligent network elements and a communications network may be, for example, a telecommunications network. The work force administration system may be a work and force administration/control (WFA/C) system and the recovery dispatch system may be a work and force administration/dispatch in (WFA/DI) or an integrated dispatch system (IDS/force). The business rules used by the non-utilized asset recovery management system 270 may be stored in a business rules database 259 as illustrated in FIG. 2.

While the present invention is illustrated with reference to the various modules 265, 266, 270 being application programs in FIG. 2, as will be appreciated by those of skill in the art, other configurations fall within the scope of the present invention. For example, rather than being an application program, the asset identification module 265 may also be incorporated into the operating system 252 or other such logical division of the data processing system 130. Furthermore, while the various application programs 254 are illustrated in a single data processing system, as will be appreciated by those of skill in the art, such functionality may be distributed across one or more data processing systems. For example, the database 259 may be resident on a distinct device from the application programs 254, and various modules of the application programs 254 may be resident on different devices, and distinct instantiations of the same modules may be resident on different devices. Thus, the present invention should not be construed as limited to the configuration illustrated in FIGS. 1 through 2, but may be provided by other arrangements and/or divisions of function between data processing systems. In fact, as will be clear from the description herein, the functionalities of the present invention will typically be distributed across a network of communicatively coupled computing devices and may utilize a variety of input/output devices to support a variety of network asset management services, such as asset recovery, inventory reconciliation, asset revenue recovery and updating of network assets.

Figure 3:
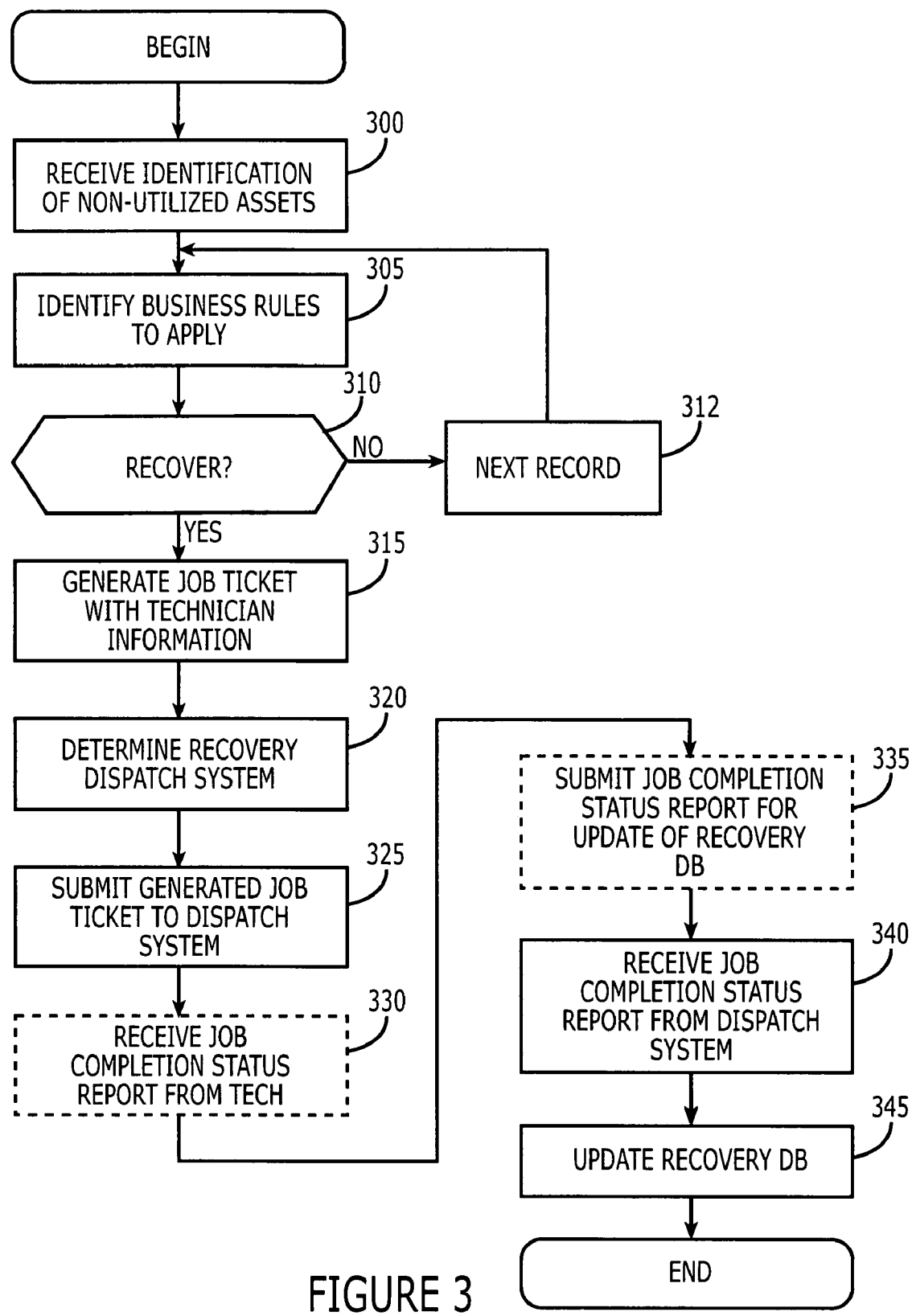
FIGS. 3-5 are flowcharts illustrating operations for asset management according to various embodiments of the present invention.

A computer-implemented method for controlling network asset recovery for a communications network will now be described with reference to the flowchart illustration of FIG. 3. As shown in the embodiments of FIG. 3, operations begin with receiving an identification of a plurality of non-utilized assets from an asset identification system (block 300). The identification may be, for example, in the form of an Excel spreadsheet or the like where respective rows (records) of the spreadsheet contain information for a corresponding one of the identified non-utilized assets. The received identification of a plurality of non-utilized assets may be generated, in some embodiments, by an asset identification system based on an automated comparison of an inventory management database for a telecommunications network and an automated querying of assets on a telecommunications network to determine a current inventory. The assets may be intelligent network elements that may be queried automatically to generate the current inventory data.

Business rules to be applied to the non-utilized assets are identified (block 305). In some embodiments, identifying business rules may include identifying a plurality of tables associated with the business rules and may further include updating the identified tables to maintain a current set of rules for use in analysis of non-utilized assets. For example, in some embodiments, updating identified tables includes determining if any of the identified tables have been changed since the last update of the identified tables and updating any of the identified tables determined to have been changed since the last update of the identified tables.

On or more of the non-utilized assets is identified automatically for recovery based on the identified business rules (block 310). More particularly, for the embodiments illustrated in FIG. 3, received identification at block 300 may include a plurality of records associated with ones of the non-utilized assets and, if the analysis of the business rules for a first of the records determines that the asset should not be identified for recovery (block 310) operations move to block 312 where a next one of the records is selected. In such a case, operations may proceed from block 312 to block 305 and block 310 where a next one of the records may be selected for analysis and determination of whether recovery should be initiated.

When one of the non-utilized assets is automatically identified for recovery based on the identified business rules (block 310), a job ticket identifying the one of the non-utilized assets is automatically generated (block 315). The automatically generated job ticket includes information from the received identification of the plurality of non-utilized assets at block 300 sufficient to direct an assigned technician to a physical location of the one of the non-utilized assets. It will be understood that the information sufficient to direct the technician to the physical location may be maintained in a distinct database and/or on a different system and that the information contained in the received identification provided at block 300 may simply provide a basis for retrieval of detailed physical location information from another source for inclusion in the job ticket at block 315. The generated job ticket in some embodiments includes data associated with the non-utilized asset or assets to be recovered from the received identification of the assets at block 300 and further includes supplemental information not contained in the received identification of the plurality of non-utilized assets.

A recovery dispatch system associated with the one of the non-utilized assets to be recovered is determined (block 320). Operations at block 320 may include determining if the physical location of the one of the non-utilized assets is a central office location or a customer location. Identifying ones of the plurality of recovery dispatch systems may, thus, be based on whether the determined physical location of the asset to be recovered is a central office location, an outside plant location or a customer location. As will be described further herein, such respective locations are typically tracked for maintenance and work force administration purposes separately within a telecommunications provider organizational structure.

The generated jobs ticket is submitted to the determined recovery dispatch system (block 325). Operations that may be performed in some embodiments by the dispatch system will now be described with reference to blocks 330 and 335. The operations described at block 330 and 335 will generally be carried out after the dispatch system has assigned the job to an appropriate technician and the technician has completed the job recovery associated with the job ticket. A job completion status report is received from the assigned technician at the recovery dispatch system (block 330). The job completion status report is submitted to the computer system generating the job ticket for use in updating a recovery database by the dispatch system (block 335).

Further operations that may be carried out according to some embodiments of the present invention will now be described with reference to blocks 340 and 345. A job completion status report is received from the recovery dispatch system (block 340). A recovery database is updated based on the received job completion status report (block 345). The recovery database may include an entry generated at block 315 recording the generated job ticket in the recovery database and the update at block 345 may update the database record generated at block 315 to reflect a completion status of the job. The status update may indicate completion of recovery of the asset or an indication of the reasons that the recovery was not successful in some embodiments.

Note that, as illustrated in FIG. 3, receiving the identification at block 300 may include testing of each of the records in the received identification against one or more business rules. Thus, in some embodiments of the present invention, operations at block 305 may be preceded by a screening to clean up the received identifications. For example, duplicate ones of the records and/or ones of the fields of the records that are missing data may be identified as part of receiving the identification at block 300. Identified duplicate ones of the records and/or records including identified ones of the fields missing data may be reported and the reported records may be skipped over when selecting a next record at block 312. Such preprocessing of the received data may reduce the analysis burden of the operations at blocks 305 and 310 and avoid redundant operations and/or a reduction of comparison operations at block 305 that will generate an error due to missing fields that are used by applied business rules.

In some embodiments of the present invention, operations at block 320 may be carried out by a work and force administration/control (WFA/C) system. The determined recovery dispatch system, in some embodiments, may be a work and force administration/dispatch in (WFA/DI) system or an integrated dispatch system (IDS/force).

Figure 4:
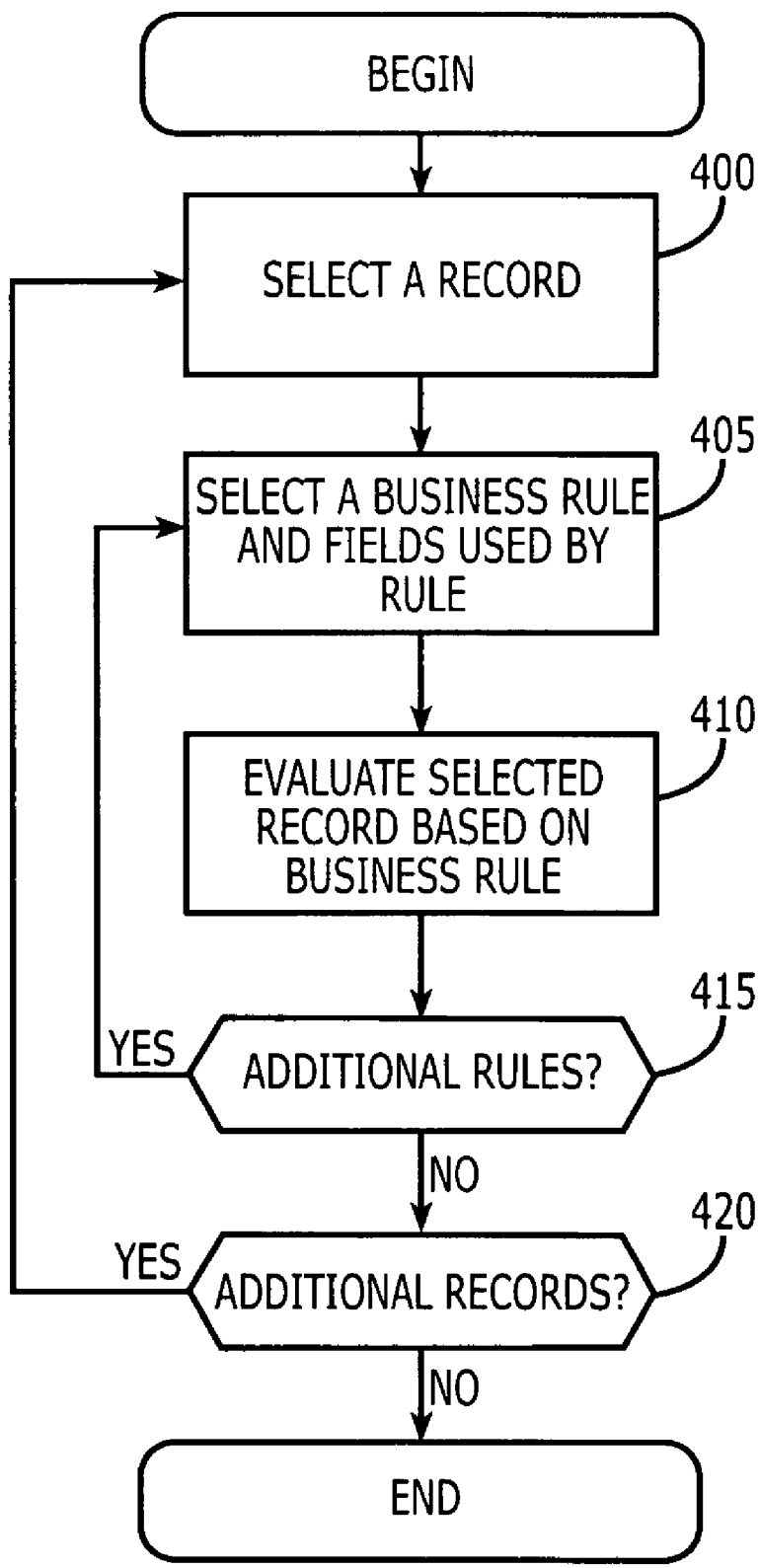

Further embodiments of the present invention will now be described with reference to the flowchart illustration of FIG. 4. More particularly, FIG. 4 illustrates operations for automatically identifying one ore more of the non-utilized assets for recovery as described above with reference to blocks 305 through 312 where the received identification at block 300 is a spreadsheet including a plurality of records, respective ones of the records being associated with a corresponding one of the non-utilized assets. Operations begin in the illustrated embodiments of FIG. 4 by selecting a next one of the records (block 400). One of the identified business rules to be used in the analysis is selected and fields of the record selected at block 400 that are used by the selected one of the identified business rules are determined (block 405). The selected business record is evaluated based on the selected one of the identified business rules and the determined fields (block 410). If additional ones of the business rules are to be applied to the selected record (block 415), operations return to block 405 and the operations of blocks 405, 410 and 415 repeat until there are no additional rules to be applied to the selected record. After analysis of all the rules, if there are additional records to be evaluated to determine if the associated assets should be recovered (block 420), operations return to block 400 to select a next one of the records. Operations at block 405-415 then repeat for the newly selected record until there are no additional records to be analyzed at block 420.

Figure 5:
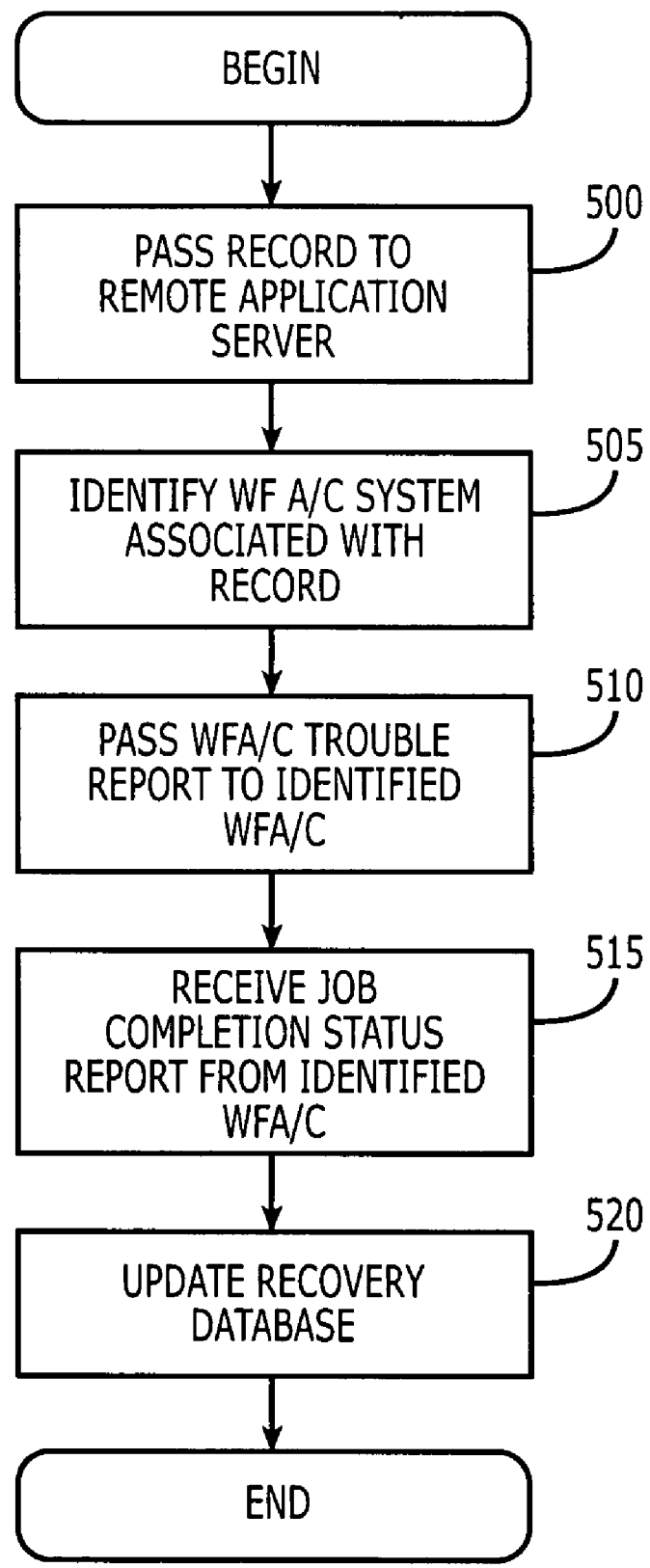

Further embodiments of the present invention will now be described with reference to the flowchart illustration of FIG. 5. For the embodiments illustrated in FIG. 5, the determination of the recovery dispatch system associated with a non-utilized asset to be recovered is carried out by a WFA/C and the WFA/C is one of a plurality of WFA/C systems associated with different remote physical locations. As shown in the embodiments of FIG. 5, operations begin by passing a record associated with the identified non-utilized asset to be recovered to a remote application server (block 500). The remote application server identifies one of a plurality of WFA/C systems as associated with the physical location of the non-utilized asset to be recovered (block 505). A WFA/C trouble report for the non-utilized asset to be recovered is passed from the remote application server to the identified one of the WFA/C systems (block 510). The receiving WFA/C may then identify a recovery dispatch system as described previously with reference to block 320 of FIG. 3.

The WFA/C receiving the trouble report at block 510 may then pass the WFA/C trouble report to the determined recovery dispatch system, such as a WFA/DI system. The WFA/DI system may, as described previously, subsequently assign the task to a technician and receive a report with a job completion status report from the technician upon completion or other resolution of the job by the technician. The job completion status report may be passed from the WFA/DI to a WFA/C system. Subsequently, the job completion status report is received from the identified one of the WFA/C systems (block 515). The recovery database associated with the job ticket is updated based on received job completion status reports (block 510).

Figure 6:
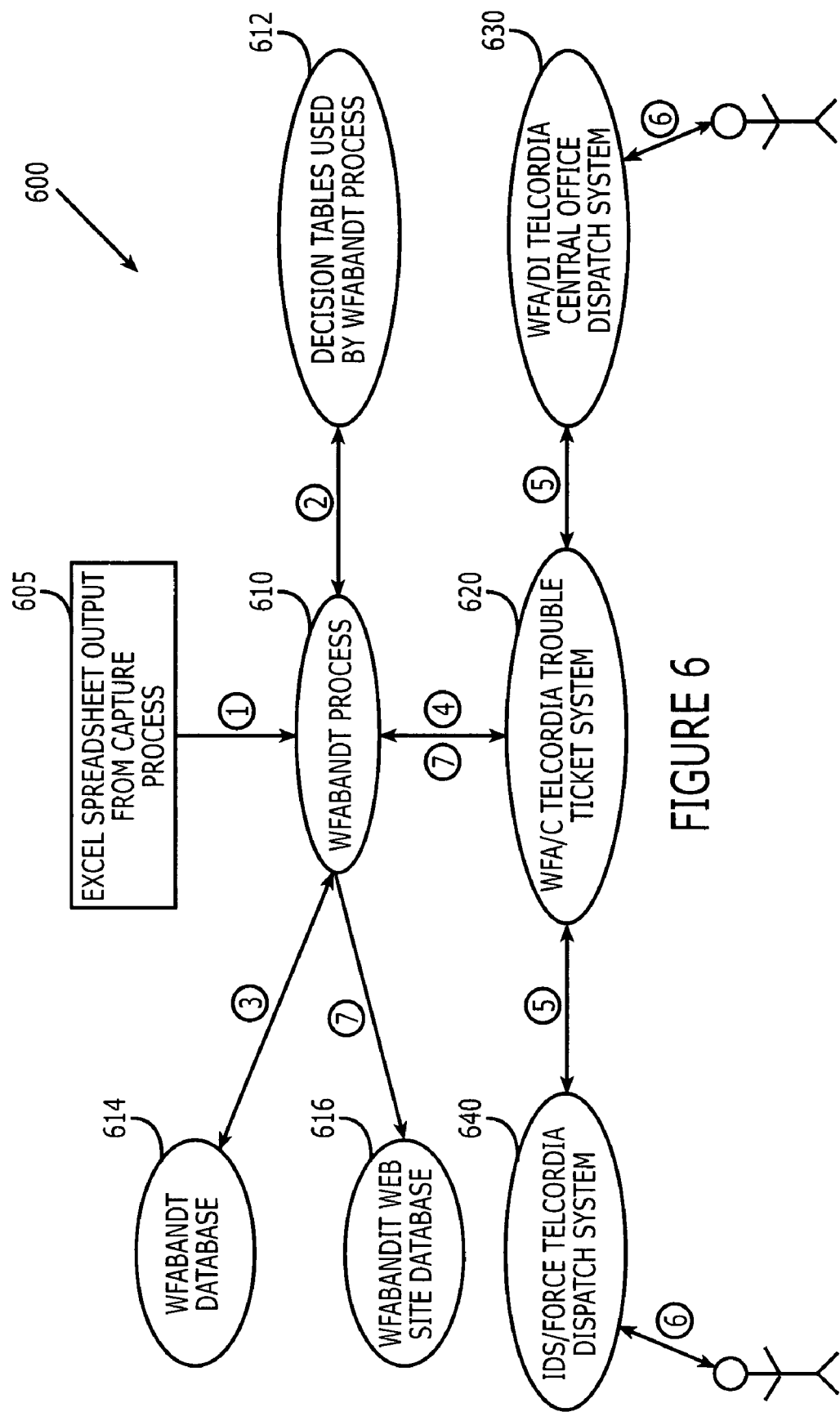
FIG. 6 is a block diagram illustrating data flows in a system for communication network asset management according to some embodiments of the present invention.

FIG. 6 is a block diagram illustrating data flows in a system for communication network asset management according to some embodiments of the present invention. As shown in the embodiments of FIG. 6, the communication network asset recovery system 610, referred to as WFABANDT Process in FIG. 6, retrieves network card information for a non-utilized asset to be recovered from an Excel spreadsheet output from an identification process 605, as shown by data flow 1 in FIG. 6. Business rules are obtained by the process 610 from decision tables 612 as indicated by dataflow 2. The card information from the Excel spreadsheet 605 is stored in an internal WFABANDT database 614 by the process 610 as indicated by dataflow 3. Card information is also sent to the WFA/C system 620 via a contract I/F as indicated by dataflow 4. The ticket associated with the contract I/F is dispatched to an inside office or outside plant recovery dispatch system based on the information supplied by the process 620 by the WFA/C system 620 as indicated by the respective dataflows 5. The respective recovery dispatch systems shown in FIG. 6 are a WFA/DI system 630 and an IDS/force system 640.

A technician recovers the non-utilized asset network card and completes dispatch by reporting on the same to the respective recovery dispatch system 630, 640 as indicated by the dataflows 6 in FIG. 6. The obtained recovery information is subsequently sent to the WFA/C system 620 and passed to the process 610 as indicated by the dataflows 7 between the system 620 and the process 610. Recovery information is further passed to a web database 616, for example, for results analysis as indicated by dataflow 7 between the process 620 and the database 616.

Figure 8:
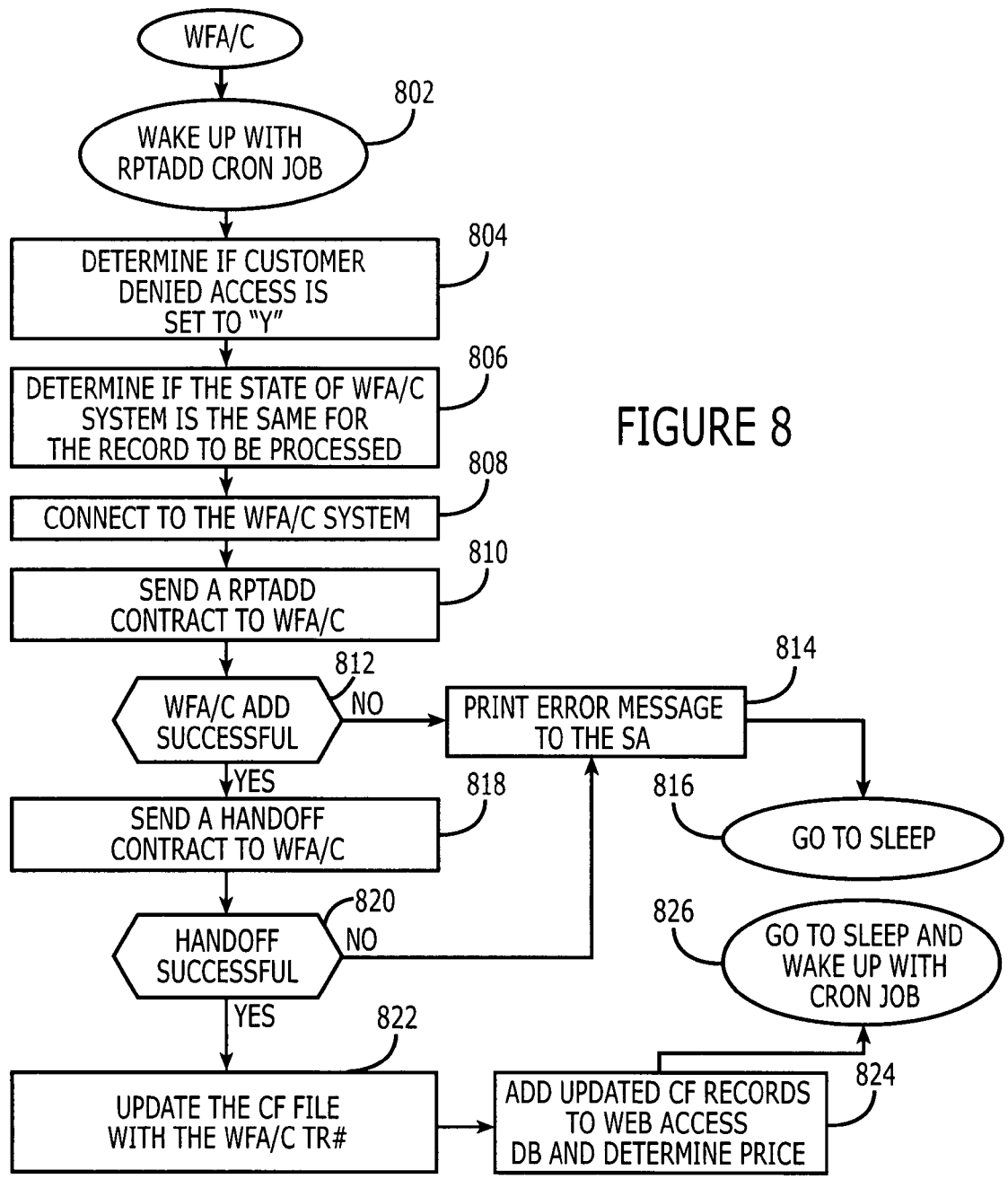
Figure 9:
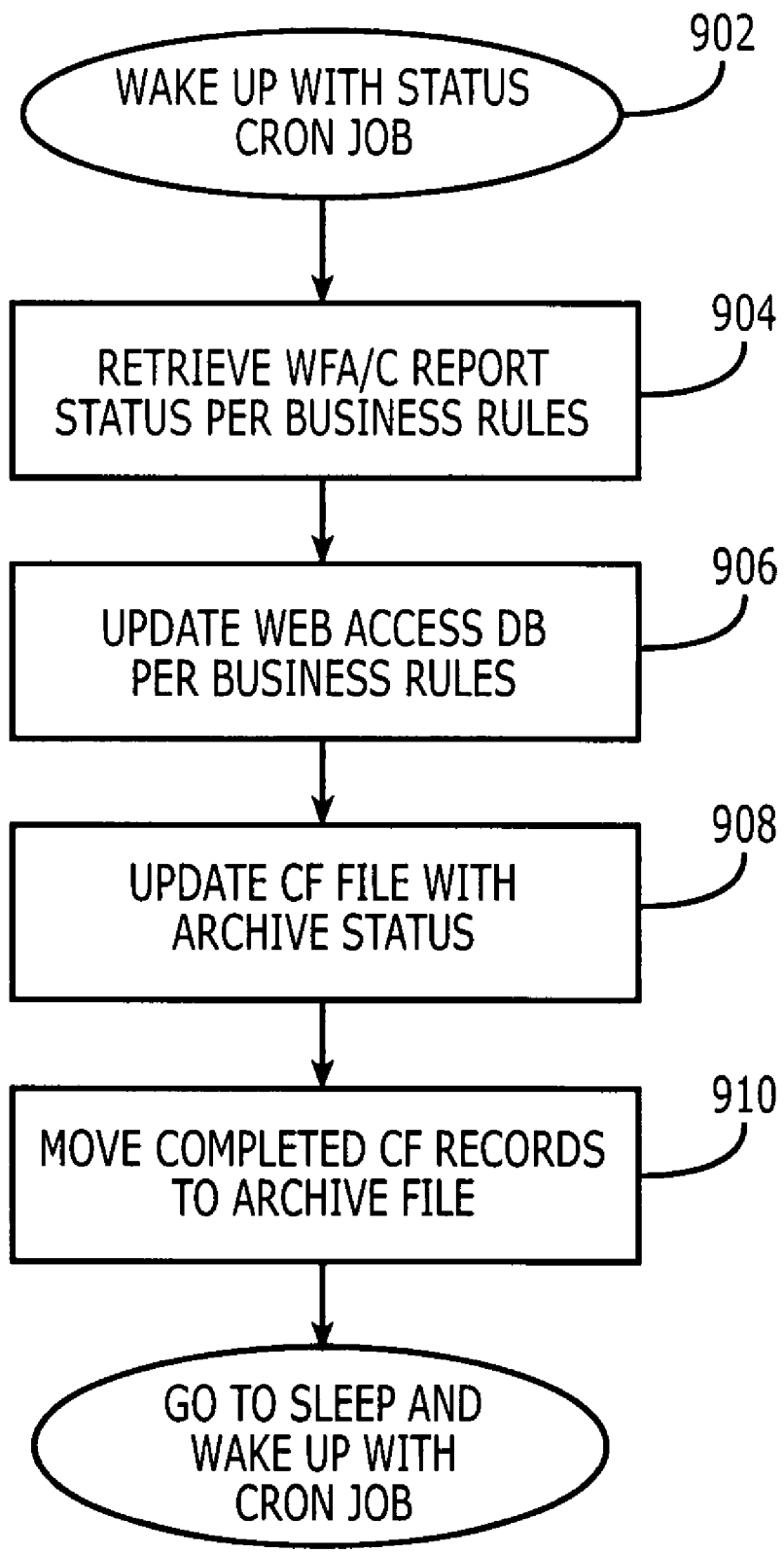

A method for controlling network asset recovery for a communications network according to further embodiments of the present invention will now be described with reference to FIGS. 7-9. To associate the following description with the exemplary flow context described above, the WFABANDT process will read the spreadsheet above, which may be an Accenture Excel Spreadsheet, and create an internal candidate file report (CF) that will be used to process card recovery. Using a set of business rules, WFABANDT will determine if there are duplicate cards and critical blank fields on the Candidate Report. Reports will be created if any cards fail the duplicate or blank field test. The process will then update the report with additional data elements, and update the report with exceptions that have been determined by the STC as a result of feedback from the field. Card recovery operations are then processed.

Figure 7A:
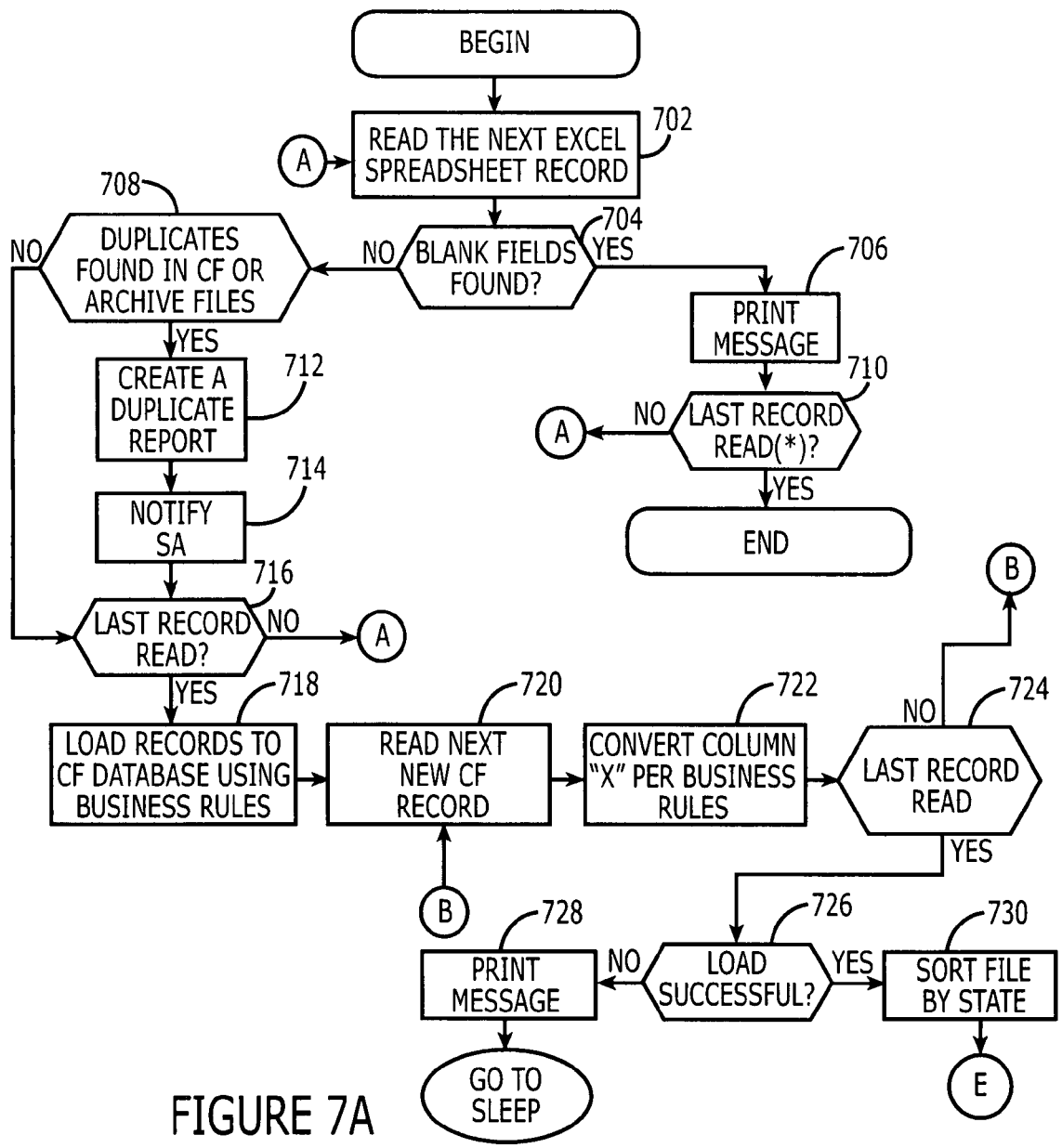
FIGS. 7A, 7B and 8-9 are flowcharts illustrating operations for communication network asset management according to various embodiments of the present invention.
Figure 7B:
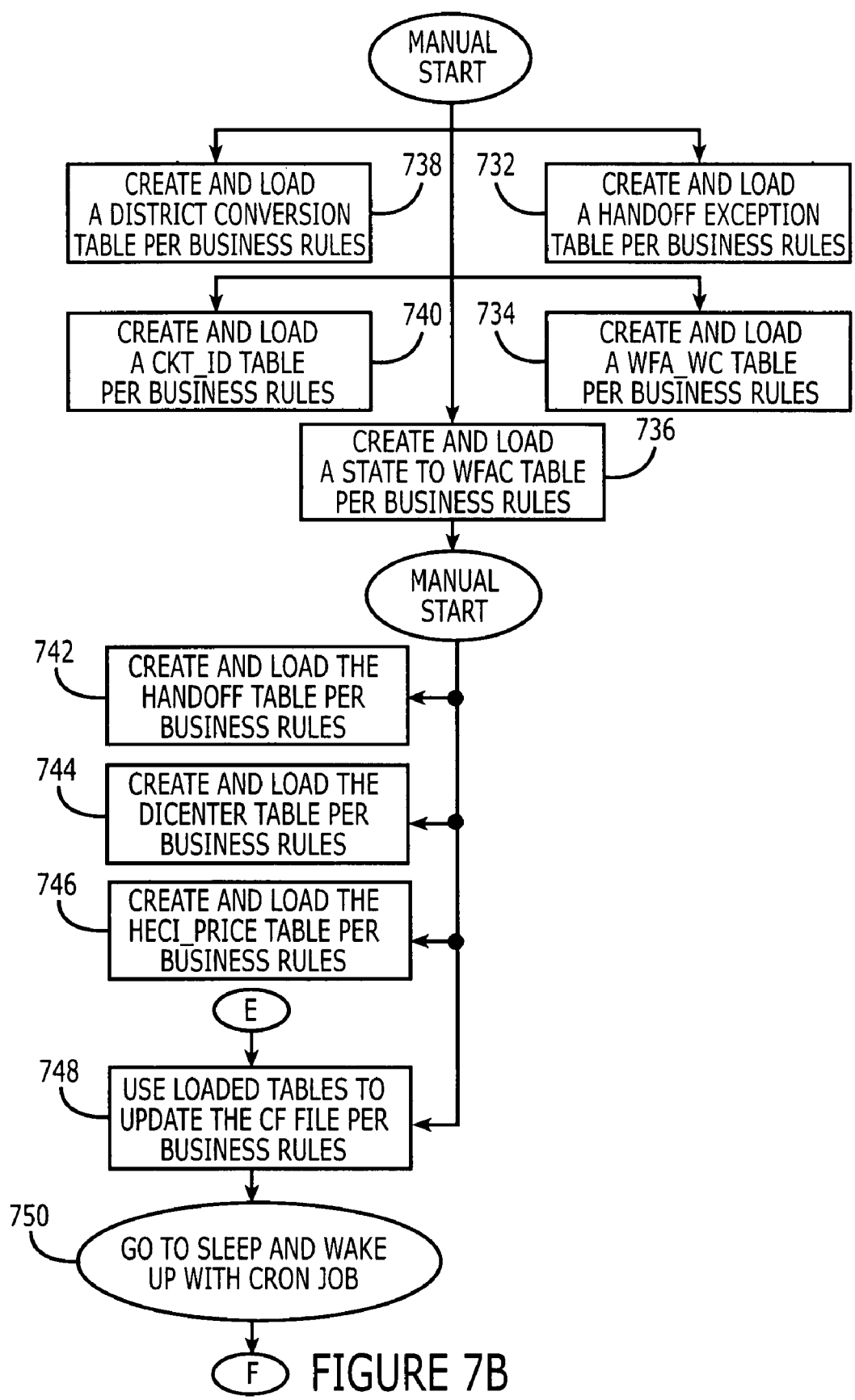

Referring first to FIGS. 7A-7B, operations begin by reading a next spreadsheet record from a spreadsheet including identification of a plurality of non-utilized assets from an asset identification system (block 702). If blank fields are found in the record (block 704) a message reporting the same is generated (block 706). If the read record is a last record (block 710) operations terminate. If no blank fields are found (block 704), operations move to block 708. If duplicates are found in the candidate file (CF) at block 708, a duplicate report is created (block 712) and a notification is generated (block 714). Operations at block 712 may include looping through all records in the Excel spreadsheet to generate a single report for all duplicate records.

After completion of duplicate processing or if no duplicate records are found at block 708, operations move to block 716. If the last record has not been read (block 716 or block 710) operations move to block 702 for a next record as indicated by the connectors "A" in FIGS. 7A-7B. If the last record has been read (block 716), records are loaded to the CF database using business rules (block 718). A next new CF record is read (block 720) and an exemplary first conversion operation is performed on a selected column per business rules (block 722). The operations at block 722 are illustrative to show that the business rules may interact with the field information in the record being analyzed as part of the process. In other words, the business rules themselves may be used to change a field value in a data record as illustrated at block 722. If the last record has not been read (block 724) operations return to block 720 as illustrated by the connectors "B" in FIGS. 7A-7B. Otherwise, operations move to block 726.

If a load is successful (block 726), the loaded file is sorted by state (block 730) and operations move to block 748 as indicated by the connector "E." If the load is not successful (block 726), a message reporting the same is generated (block 728) and the process goes to a sleep state.

As further indicated in FIGS. 7A-7B, additional operations related to loading and updating tables containing business rules may be selectively carried out. In particular, blocks 732 through 746 illustrate creation and loading of various tables associated with business rules. The operations in these respective blocks are illustrative of different tables that may be utilized for the business rules. Furthermore, the operations at each of these blocks may be selectively carried out based on whether the respective tables have been created previously and/or require updating due to changes. Thus, blocks 732-746 are illustrative of table-based business rule operations that may be selectively carried out during operations according to some embodiments of the present invention. Rule processing proceeds as illustrated at block 748 by using the loaded tables to update the CF file per the business rules. The system may then go to a sleep state until woken up by a chronometer (CRON) process, which may be used to control the interval of frequency of operations for the respective operations described herein (block 750).

Further operations according to some embodiments of the present invention will now be described with reference to the flowchart illustration of FIG. 8. As shown in the flowchart of FIG. 8, a process carried out by the WFA/C system interface is woken up responsive to a chronometer (CRON) process (block 802). Various initialization operations subsequently occur including determining if a customer has been denied access (block 804), determining if the state or WFA/C system is the same for the record to be processed (block 806), connecting to the WFA/C system (block 808) and sending a contract (referred to as a RPTADD) to the WFA/C (block 810). In other words, the operations at block 804 through 810 may be carried out by the process 610 of FIG. 6 preparatory to submission of the contract to the WFA/C.

If the WFA/C add of the contract is successful (block 812), a handoff contract is sent to the WFA/C (block 818). Otherwise, an error message is generated (block 814) and the process may transition to a sleep state (block 816). If the handoff sent at block 818 is successful (block 820), the CF file is updated with a tracking number of the WFA/C (block 822), updated CF records are added to the web access database and pricing is determined (block 824) and the system may transition to a sleep state pending wake up responsive to the CRON job (block 826). If the handoff is not successful (block 820), operations may move to block 814 for printing of an error message before going to the sleep state at block 816.

Further details of operations for some embodiments of the present invention will now be described with reference to the flowchart of FIG. 9. As shown in FIG. 9, operations begin by transitioning the process (process 610 of FIG. 6) to a wake up state responsive to the CRON job (block 902). WFA/C report status is retrieved per business rules (block 904). The web access database is updated per the business rules (block 906). The CF file in the database 614 of FIG. 6 is updated with an archive status designation (block 908). The completed CF records are moved to an archive file (block 910). The process illustrated in FIG. 9 may then return to the sleep state pending wake up responsive to the CRON job. Thus, the operations described with reference to FIG. 9 generally relate to updating of the databases 614, 616 of FIG. 6 by the process 610 of FIG. 6.

Thus as described above, during card recovery, in some embodiments, once the candidate report has been automatically scrubbed and is ready for dispatch, the WFABANDT Windows application client may pass the file of cards to be processed in work and force administration/control (WFA/C), to a remote application server, such as a UNIX server application program. The UNIX application will connect to the appropriate WFA/C system, based on where the card physically resides. Using a set of business rules, contracts and tables, WFABANDT will create a WFA/C trouble report for each of the cards to be recovered. The WFA/C report will then be handed off to WFA/DI or IDS using a set of business rules. All of the information required by the central office or field technicians my be entered into the report, which may eliminate the need for the technicians to access the CAPTURE Website (block 616) for additional information. This feature may save, for example, up to about four minutes per card recovery compared to the manual process described above.

After the WFA/DI or IDS handoff has been invoked, the UNIX application will pass the Candidate File back to the Windows client. The Windows application will access the CAPTURE website database and add the candidate cards to the web access database. The WFA/C trouble report number will be added to the web database as a reference back to the WFA/C report.

When the technician has recovered the card(s), and has completed their WFA/DI or IDS report, WFA/C may automatically complete the report. A status report may be automatically pushed to a file. The WFABANDT Windows application may automatically check the WFA/C status file each day, based on a CRON setting to see if the WFA/C reports have been completed. WFABANDT may update its candidate file with the dispatch completion information. WFABANDT may then access the CAPTURE website. The Website database records may be updated to reflect the card completion.

Once the candidate card has been completed, WFABANDT may move the competed records to an archive file. The WFABANDT candidate report file may always be in synchronization with the Website database of "Not Worked" cards. Website cards that have been recovered or closed as not recovered, may always be in synchronization with the WFABANDT Archive file.

Such a process may provide a variety of benefits compared to the exemplary process described above. Such benefits may include:

A. Manual involvement by the STC to add or update data fields on the Candidate Report may be automated.
 B. There may only be one system (WFA/C) used by the STC for finding records, verifying the status of a card, or as a work-list of cards to be recovered.
 C. Field supervisors or WMC personnel will not have to come into PMA and move tickets to LMOS for dispatch.
 D. Field technicians will not have to come into the CAPTURE website to obtain additional card information; nor will they have to come in after the dispatch to complete the web records. This time may be, for example, four minutes per card recovery as set in the ESM system.
 E. The WFA/DI transfer will not be required which will reduce WFA/DI CPU.
 F. Determination and reporting of duplicate candidate cards may be automated.
 G. The total time to complete the candidate process may be reduced, for example, from three to four days to one day.
 H. The capability to determine if there are unique dispatch groups within field operations, which may prevent incorrect dispatches to the wrong work group where there are multiple work groups involved (associated with) a particular location and the ticket should be addressed to a particular one of the work groups.

As will be appreciated by one of skill in the art, the present invention may be embodied as a method, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk, PERL or C++. However, the computer program code for carrying out operations of the present invention may also be written in conventional procedural programming languages, such as the "C"

programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of FIGS. 1 through 4 illustrate the architecture, functionality, and operations of some embodiments of methods, systems, and computer program products for controlling network asset recovery. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A computer-implemented method for controlling network asset recovery for a communication network, comprising:
   receiving an identification of a plurality of non-utilized assets from an asset identification system;
   identifying business rules to be applied to the non-utilized assets;
   automatically identifying one of the non-utilized assets for recovery based on the identified business rules;
   automatically generating a job ticket identifying the one of the non-utilized assets and including information from the received identification of the plurality of non-utilized assets sufficient to direct an assigned technician to a physical location of the one of the non-utilized assets;
   determining a recovery dispatch system associated with the one of the non-utilized assets; and
   submitting the generated job ticket to the determined recovery dispatch system;
   wherein determining a recovery dispatch system associated with the one of the non-utilized assets is carried out by a Work and Force Administration/Control (WFA/C) system and wherein the determined recovery dispatch system comprises a Work and Force Administration/Dispatch In (WFA/DI) system or an integrated dispatch system (IDS/Force); and
   wherein the WFA/C system is one of a plurality of WFA/C systems associated with different remote physical locations and wherein determining a recovery dispatch system comprises:
   passing a record associated with the identified one of the non-utilized assets to a remote application server;
   identifying one of the plurality of WFA/C systems associated with the physical location of the identified one of the non-utilized assets at the remote application server; and
   passing a WFA/C trouble report for the identified one of the non-utilized assets from the application server to the identified one of the WFA/C systems.

2. The method of claim 1, wherein identifying business rules to be applied to the non-utilized assets comprises:
   identifying a plurality of tables associated with the business rules;
   determining if any of the identified tables have been changed since a last update of the identified tables; and
   updating any of the identified tables determined to have been changed since the last update of the identified tables.

3. The method of claim 1, wherein automatically generating a job ticket includes recording the job ticket in a recovery database and wherein submitting the generated job ticket is followed by:
   receiving a job completion status report from the determined recovery dispatch system; and
   updating the recovery database based on the received the job completion status report.

4. The method of claim 3, wherein submitting the generated job ticket is followed by:
   receiving the job completion status report from the assigned technician at the determined recovery dispatch system; and
   submitting the job completion status report for use in updating the recovery database.

5. The method of claim 1 wherein determining the recovery dispatch system associated with the one of the non-utilized assets further comprises:
   determining if the physical location of the one of the non-utilized assets is a central office location, an outside plant location or a customer location; and
   identifying one of a plurality of recovery dispatch systems as the determined recovery dispatch system based on whether the determined physical location of the one of the non-utilized assets is a central office location, an outside plant location or a customer location.

6. The method of claim 1, wherein the received identification of a plurality of non-utilized assets is generated by the asset identification system based on an automated comparison of an inventory management database for a telecommunications network and an automated querying of assets on the telecommunications network to determine a current inventory.

7. The method of claim 1, wherein the received identification of the plurality of non-utilized assets comprises a spreadsheet including a plurality of records, respectively associated with ones of the non-utilized assets and wherein automatically identifying the one of the non-utilized assets for recovery comprises:

selecting a next one of the records;

selecting one of the identified business rules and determining fields of the next one of the records used by the selected one of the identified business rules;

evaluating the next one of the business records based on the selected one of the identified business rules and the determined fields;

repeating selecting one of the identified business rules and evaluating based on the selected one of the identified business rules and the determined fields for others of the plurality of identified business rules; and repeating selecting a next one of the records, selecting one of the identified business rules, evaluating and repeating selecting one of the identified business rules for each of the records.

8. The method of claim 7, wherein selecting one of the identified business rules is preceded by:

identifying duplicate ones of the records;

identifying ones of the fields of the records that are missing data;

reporting identified duplicate ones of the records and/or records including identified ones of the fields missing data; and skipping selecting identified duplicate ones of the records and/or records including identified ones of the fields missing data as the next one of the records.

9. The method of claim 8, wherein identifying duplicate ones of the records is accomplished using a hash function.

10. The method of claim 1, wherein passing a WFA/C trouble report is followed by passing the WFA/C trouble report from the identified one of the WFA/C systems to the WFA/DI system.

11. The method of claim 10, wherein automatically generating a job ticket includes recording the job ticket in a recovery database and wherein passing the WFA/C trouble report from the identified one of the WFA/C systems to the WFA/DI system is followed by:

receiving a job completion status report from the identified one of the WFA/C systems; and updating the recovery database based on the received job completion status report.

12. The method of claim 1 wherein the generated job ticket includes data associated with the one of the non-utilized assets from the received identification of the plurality of non-utilized assets and further includes supplemental information not contained in the received identification of the plurality of non-utilized assets.

13. The method of claim 1 wherein the assets comprise intelligent network elements and wherein the communications network comprises a telecommunications network.

* * * * *